United States Patent

Solntsev et al.

[11] Patent Number: 5,534,300
[45] Date of Patent: Jul. 9, 1996

[54] TWO-LAYER HIGH TEMPERATURE COATING ON A CERAMIC SUBSTRATE, AND PROCESS FOR OBTAINING SAME

[75] Inventors: Stanislav S. Solntsev; Vladimir M. Tjurin; Natalia V. Izaeva; Alexei Y. Bersenev; Galina A. Solovjeva, all of Moscow, U.S.S.R.

[73] Assignees: Aerospatiale Societe Nationale Industrielle, Paris, France; VIAM-All Russian Institut of Aviation Materials, Moscow, U.S.S.R.

[21] Appl. No.: 404,921

[22] Filed: Mar. 16, 1995

[30] Foreign Application Priority Data

Mar. 16, 1994 [FR] France .................... 94 03049

[51] Int. Cl.$^6$ .................... B05D 3/02
[52] U.S. Cl. .................... 427/376.2; 427/299; 427/397.7; 427/419.4; 427/417.6; 427/417.7; 427/421
[58] Field of Search .................... 427/376.2, 397.7, 427/299, 421, 419.4, 419.7, 419.6

[56] References Cited

U.S. PATENT DOCUMENTS 3,953,646  4/1976  Fletcher et al. .................... 428/332
4,093,771  6/1978  Goldstein et al. .................... 428/312
4,381,333  4/1983  Stewart et al. .................... 428/312.6

OTHER PUBLICATIONS

Chemical Abstracts, vol. 118, No. 24, p. 369, Jun. 1993.

*Primary Examiner*—Shrive Beck
*Assistant Examiner*—David M. Maiorana
*Attorney, Agent, or Firm*—Burns, Doane, Swecker & Mathis

[57] ABSTRACT

The high temperature coating for the protection of ceramic materials, in particular porous ones, from erosion and chemical and/or mechanical failure according to the invention comprises a barrier (primer) layer and an emissivity glaze (topcoat) layer, with the following weight compositions:

barrier layer:
 silicon tetraboride (with over 96 weight % of $SiB_4$): 0.1 to 10%;
 quartz glass: 90 to 99.9%; emissivity glaze layer:
 silicon tetraboride (with over 96 weight % of $SiB_4$): 1.5 to 5.0%;
 high silica glass: 95 to 98.5%.

9 Claims, No Drawings

5,534,300

1

TWO-LAYER HIGH TEMPERATURE COATING ON A CERAMIC SUBSTRATE, AND PROCESS FOR OBTAINING SAME

FIELD OF THE INVENTION

The invention relates to materials, and more precisely to coatings, for the protection of ceramic substrates, in particular porous ones, from erosion and chemical and mechanical failure.

Refractory oxide based fibrous ceramic materials functioning at high temperatures are widely used. The conditions under which these materials are used place demands on the coatings used for their protection: high heat resistance, erosion resistance, thermochemical stability and phase stability.

BACKGROUND OF THE INVENTION

There is known at present a whole range of erosion resistant coatings which operate at temperatures of up to 1260° C. There is known a two-layer coating comprising a barrier layer and a glaze layer (see U.S. Pat. No. 3,953,646). The barrier layer is formed by a deposit of fused silica comprising approximately 80 to 90% by weight of solid material. The coating is applied to the substrate by spraying. The barrier layer is fired at a temperature of approximately 930 to approximately 1370° C. The glaze layer, consisting of high silica glass, of borosilicate glass and of an emissivity agent, is applied to the barrier layer. The emissivity layer is selected from the group formed by silicon carbide, chromium, cobalt and nickel oxides, nickel-chromium spinels, silicon nitride and calcined, mixed oxides of iron, chromium and/or nickel. High silica glass (Corning Glass No. 7913) contains not less than 94 weight % of $SiO_2$. The weight composition of the borosilicate glass (Corning Glass No. 7740) is as follows: 70 to 87% of $SiO_2$, 10 to 20% of $B_2O_3$, 2 to 5% of $Na_2O$ and 1 to 5% of $Al_2O_3$.

The high silica glass component and the borosilicate glass component are used in a weight ratio of approximately 3:1 to approximately 19:1, and the glass components (high silica glass and borosilicate glass) and the emissivity agent are used in a weight ratio ranging from 50:1 to approximately 4:1. An aqueous slurry containing from approximately 10 to approximately 90 weight % of glaze coating is fired at a temperature ranging from 930° to approximately 1370° C.

There is known in the art (see U.S. Pat. No. 3,955,034) a three-component coating for silica insulation comprising a silica barrier layer, an emissivity layer comprising a high silica glass component and an emissivity agent selected from the group formed by silicon carbide, nickel oxide, chromium oxide, cobalt oxide, a nickel-chromium spinel, silicon nitride and calcined, mixed oxides of iron, chromium and cobalt, with a weight ratio of the high silica glass to the emissivity agent ranging from approximately 50:1 to approximately 4:1, and an overglaze layer of high silica glass and borosilicate glass in a weight ratio of high silica glass to borosilicate glass ranging from approximately 3:1 to approximately 19:1. The coating is fired at a temperature ranging from 930° to approximately 1370° C.

These coatings provide neither sufficient thermal shock resistance nor sufficient heat emissive stability, and they are subject to shrinkage.

To overcome the problems mentioned above, there has been proposed a one-layer coating (see U.S. Pat. 4,093,771) which is prepared by reacting a compound, selected from the group of substances formed by silicon tetraboride, silicon hexaboride, other boron silicides, boron and mixtures of these substances, with a reactive glass frit composed of high silica porous borosilicate glass and boron oxide. A thin layer of borosilicate glass is formed on finely divided particles of high silica glass, which improves the sintering of the coating without a substantial increase in the thermal expansion coefficient.

The reactive glass frit is advantageously prepared by blending approximately 2 to 10 parts by weight of boron oxide with 100 parts by weight of high silica porous borosilicate glass, such as Vycon® 7930 glass. Vycon® 7930 high silica borosilicate glass has a porosity of approximately 28%. The boron oxide is dissolved in 200 to 400 parts by weight of deionized water. The mixture is stirred at approximately 95° C., and then dried for a period of up to 24 hours, at a temperature of 75° to 95° C. The resulting glass frit is dispersed, screened and fired at 1150° C. for 1 hour. The resulting sintered composite is ground to a powder and screened.

A typical composition would be 97.5 weight % of reactive glass frit containing 5.5 weight % of boron oxide, combined with 2.5 weight % of silicon tetraboride composed of 63±3 weight % of silicon, 36±3 weight % of boron and less than 0.2 weight % of magnesium. The coating slurry is prepared by blending finely divided particles of reactive glass frit and silicon tetraboride, with a carrier such as ethanol and a pre-binder such as methylcellulose, in a proportion by weight of solid components of 35 to 50%. The mixture of coating components is milled in an alumina ball mill with alumina balls for 3 to 12 hours. The coating is applied by spraying. The coated samples are dried for 2 to 5 hours at temperatures in the range of 20° to approximately 70° C. After drying, the coated samples are glazed in an oven for 1.5 hours at 1215° C. The coating has an emissivity of approximately 0.90 to 0.93 from ambient temperature to over 1260° C. The thermal expansion coefficient is $1.1 \cdot 10^{-6}$ $K^{-1}$.

There is also known an advanced low density coating for the protection of aluminosilicate porous materials that has an operating temperature of up to 1300° C. The composition of the coating comprises 77.5 weight % of reactive glass frit, 2.5 weight % of silicon tetraboride and 20 weight % of molybdenum disilicide. The coating is formed on the substrate at 1230° C. for 1.5 hours (see: Advanced Porous Coating for low density Ceramic Insulation Materials, J. Amer. Ceram. Soc., vol. 72, No. 6, pages 1003–1010, 1989).

The use of high silica borosilicate glass having an active surface in the coating composition can lead to a reduction in thermochemical stability and phase stability.

Phase transformations in the coating are linked with the formation of α-cristobalite which causes cracking in the coating.

SUMMARY OF THE INVENTION

The present invention provides a high temperature coating on a ceramic substrate which does not have the drawbacks of the prior art coatings. The coating according to the invention has, in fact high thermochemical stability, high resistance to thermal shocks, very stable phases and low shrinkage.

More precisely, the invention provides a high temperature coating on a ceramic substrate, in particular a porous one, characterized in that this coating comprises a barrier (primer) layer containing quartz glass and silicon tetraboride with over 96 weight % $SiB_4$, and an emissivity glaze (topcoat) layer including high silica glass and silicon tetraboride with over 96 weight % of $SiB_4$, which layers have the following weight compositions: barrier layer:

silicon tetraboride (with over 96 weight % of $SiB_4$): 0.1 to 10%;

quartz glass: 90 to 99.9%; emissivity glaze layer:

silicon tetraboride (with over 96 weight % of $SiB_4$): 1.5 to 5.0%;

high silica glass: 95 to 98.5%.

The ceramic substrate is made of a ceramic material generally comprising one or more compounds selected from the group formed by $Al_2O_3$, $ZrO_2$, $SiO_2$, SiC and $Si_3N_4$. Its density is generally higher than 100 kg/m$^3$ (0.1 g/cm$^3$).

In the coating, the content of silicon tetraboride particles the size of which is less than 5 μm is preferably of 70 to 80 weight % of the said silicon tetraboride, the $SiO_2$ content of the quartz glass is preferably 99.96 weight % and the high silica glass advantageously comprises, by weight: 94 to 96% of $SiO_2$; 3.5 to 6% of $B_2O_3$; 0.1 to 0.5% of $Al_2O_3$; and 0.1 to 0.5% of $Na_2O$.

The thermochemical properties of the high silica glass due to its specific composition, in particular in silicon, aluminum and sodium oxides, its high purity and its specific dispersity ensure the desired chemical interaction between the amorphous (glass) and ceramic polycrystalline (silicon tetraboride) components of the coating. As a result, upon the firing of the ceramic substrate with its coating, curing takes place in its reactive emissivity glaze layer. This curing makes it possible to reduce substantially the shrinkage of the ceramic substrate, to increase resistance to thermal shocks, and to increase the thermostability of the coating in order to stabilize the thermochemical properties.

The presence of over 98.5 weight % of high silica glass and of less than 1.5 weight % of silicon tetraboride in the emissivity glaze layer increases the softening temperature of the coating, which decreases its phase stability and emissivity properties. If this layer comprises less than 95 weight % of high silica glass, and more than 5 weight % of silicon tetraboride, its heat resistance and thermochemical stability are insufficient.

A content of over 80 weight % of silicon tertraboride particles having a size of less than 5 μm leads to a substantial increase in its penetrance through the porous ceramic substrate, which leads to shrinkage of the latter. A content of particles of this type of less than 70 weight % leads to non-uniform local distribution of silicon tetraboride through the glass matrix, which increases the stress on the coating and reduces its resistance to thermal shocks.

Humidity and dispersion of the silicon tetraboride are controlled. If the quartz glass content of the barrier layer is greater than 99.9 weight %, the density of the interface between the barrier layer and the substrate is too low, which reduces the adhesion between the coating and the substrate and increases the penetrability of the emissivity glaze layer, which leads to shrinkage. If the quartz glass content is less than 90 weight %, the density of the barrier layer increases substantially, which leads to its non-uniform impregnation by the composition of the slurry intended to form the emissivity glaze layer, as well as to the appearance of cracking in the latter.

The use of high silica borosilicate glass, having an active surface, in the coating composition could lead to a reduction in its thermochemical stability and its phase stability.

Phase transformations in the coating are linked with the formation of α-cristobalite, which causes cracking of the coating.

Penetration of the porous substrate by the coating confers high adhesion. A densified layer having a thickness of 70 to 140 μm and a density of up to 500 kg/m$^3$ (0.5 g/cm$^3$) is generally formed on the substrate. The coating is advantageously applied using compressed air at a pressure of $0.8 \cdot 10^5$ to $1.1 \cdot 10^5$ Pa (0.8 to 1.1 atm). The dispersion phase (coating powder):dispersion medium (preferably distilled water) weight ratio is from 1:1 to 1:5. A high dispersion medium content, in particular a high water content, leads to a non-uniform chemical composition of the coating. A low water content leads to reduction in adhesion between the coating and the substrate. The coating is applied to the surface of the ceramic substrate that has received a preliminary treatment, for example by dedusting the felt forming the substrate, for better adhesion.

Firing the barrier (primer) layer at temperatures ranging from 1100° to 1150° C. for 10 to 20 minutes and firing the emissivity glaze layer (topcoat) at temperatures ranging from 1250° to 1300° C. for 10 to 20 minutes enable shrinkage of the material to be reduced.

The shrinkage of the coated material takes place at firing temperatures of over 1300° C. and for firing times of over 20 minutes, whereas the emissivity properties decrease with temperatures and firing times below the values indicated hereabove.

According to another of its aspects, the invention thus relates to a process for providing a ceramic substrate, in particular a porous one, with the above-described coating, characterized in that it essentially comprises the steps consisting of:

preparing a first slurry of a powder consisting of 0.1 to 10 weight % of silicon tetraboride (with over 96 weight % of $SiB_4$) and 90 to 99.9 weight % of quartz glass, in a compatible dispersion medium, preferably distilled water, with a powder to liquid weight ratio of 1:1 to 1:5;

applying this first slurry, by spraying under pressure, onto the ceramic substrate to be coated, which has undergone a preparatory treatment;

drying the layer thus obtained and firing it at a temperature of between 1100° and 1150° C. for 10 to 20 minutes, to obtain a barrier layer;

preparing a second slurry of a powder consisting of 1.5 to 5.0 weight % of silicon tetraboride (with over 96 weight % of $SiB_4$ ) and from 95 to 98.5 weight % of high silica glass in a compatible dispersion medium, preferably distilled water, with a powder to liquid weight ratio of 1:1 to 1:5;

applying this second slurry, by spraying under pressure, onto the barrier layer formed previously;

drying the layer thus obtained and firing it at a temperature of 1250° to 1300° C. for 10 to 20 minutes, to obtain an emissivity glaze layer.

The following examples are intended to illustrate and more clearly explain the invention.

EXAMPLE 1

A coating was prepared using slurry coating-firing techniques.

Firstly, the barrier layer (primer layer) was prepared. Quartz glass was milled in an alumina ball mill to produce a powder having a specific surface of 0 6 to 1 m$^2$/g, and screened. 95 parts by weight of quartz glass and 5 parts by weight of silicon tetraboride comprising 70 weight % of particles having a size of less than 5 μm were blended in a polyethylene vessel for 25 hours. A weighed quantity of powder was diluted with distilled water in a weight ratio of 1:1 and applied by spraying at an air pressure of $10^5$ Pa (1 atm) onto the surface, pre-treated by dedusting, of a fiber based ceramic material. A densified layer with a thickness of 100 μm was applied. The sample was dried in air for 30 minutes and in an oven at 80° C. for 30 minutes. The barrier layer (primer layer) was then fired at 1120° C. for 15 minutes.

The cooling emissivity glaze layer (topcoat) was then applied to the barrier layer.

The emissivity glaze layer was prepared from 95 parts by weight of high silica glass and 5 parts by weight of silicon tetraboride comprising 70 weight % of particles having a size of less than 5 μm. The glass was milled in an alumina ball mill to produce a powder having a specific surface of 0.6 to 1 $m^2$/g, and screened. The glass and silicon tetraboride powders were blended in a polyethylene vessel for 48 hours.

A weighed quantity of powder was diluted with distilled water, in a weight ratio of 1:3, and applied to the barrier layer (primer layer) by spraying at an air pressure of $10^5$ Pa (1.0 atm). The sample was dried in air at 20° C. for 30 minutes and in an oven at 80° C. for 30 minutes. The emissivity glaze layer was fired at 1250° C. for 15 minutes.

EXAMPLE 2

The barrier layer was prepared according to the process of Example 1. It comprised 98 weight % of quartz glass and 2 weight % of silicon tetraboride containing 75 weight % of particles having a size of less than 5 μm. The powder:water ratio was 1:2 and the air pressure was $0.8 \cdot 10^5$ (0.8 atm). The thickness of the densified layer obtained was 70 μm. The barrier layer was fired at 1150° C., for 10 minutes.

The emissivity glaze layer was prepared according to the process of Example 1.

EXAMPLE 3

The emissivity glaze layer comprised 98 weight % of high silica glass and 2 weight % of silicon tetraboride containing 80 weight % of particles having a size of less than 5 μm.

The emissivity glaze layer (topcoat) was applied to a barrier layer (primer layer) prepared according to the process of Example 2 and fired at 1280° C., for 10 minutes.

The coating was subjected to thermochemical and phase stability tests and to erosion resistance tests in a dissociated air flow. After 30 cycles at 1250° C., the α-cristobalite content was not greater than 0.5 weight %.

Thermochemical stability was evaluated by electron microscopy through the thickness of the porous layer (defective layer formed during the thermochemical stability test) the value of which was 30 μm. Integral emissivity was 0.86 and the thermal expansion coefficient was $1.1 \cdot 10^{-6} K^{-1}$. There was no shrinkage of the coating.

We claim:

1. A process for providing a ceramic substrate with a coating which includes a barrier layer containing quartz glass and silicon tetraboride with over 96 weight percent $SiB_4$ and an emissivity glaze layer containing high silica glass and silicon tetraboride with over 96 weight percent $SiB_4$, wherein said barrier layer comprises about 0.1 to 10 weight percent of said silicon tetraboride and about 90 to 99.9 weight percent of said quartz glass, and said emissivity glaze layer comprises about 1.5 to 5.0 weight percent of said silicon tetraboride and about 95 to 98.5 weight percent high silica glass, said process comprising the steps of:

(i) preparing a first slurry of a powder comprising about 0.1 to 10 weight % of silicon tetraboride with over 96 weight % of $SiB^4$, and about 90 to 99.9 weight % of quartz glass, in a compatible dispersion medium, with a powder to liquid weight ratio of about 1:1 to 1:5;

(ii) applying the first slurry, by spraying under pressure, onto a ceramic substrate which has undergone a preparatory treatment;

(iii) drying the resulting layer and firing it at a temperature of between about 1100° and 1150° C. for about 10 to 20 minutes, to obtain a barrier layer;

(iv) preparing a second slurry of a powder comprising about 1.5 to 5.0 weight % of silicon tetraboride $SiB_4$ and from about 95 to 98.5 weight % of high silica glass in a compatible dispersion medium, with a powder to liquid weight ratio of about 1:1 to 1:5;

(v) applying the second slurry, by spraying under pressure, onto the barrier layer; and (vi) drying the layer resulting from step (v) and firing it at a temperature of about 1250° to 1300° C. for about 10 to 20 minutes, to obtain an emissivity glaze layer.

2. The process according to claim 1, wherein the compatible dispersion medium is distilled water.

3. The process according to claim 1, wherein the ceramic substrate comprises one or more compounds selected from the group consisting of $Al_2O_3$, $ZrO_2$, $SiO_2$, SiC and $Si_3N4$, and has a density higher than 0.1 $g/cm^3$.

4. The process according to claim 1, wherein the content of silicon tetraboride particles the size of which is less than 5 μm, is 70 to 80 weight % of the silicon tetraboride.

5. The process according to claim 1, wherein the $SiO_2$ content of the quartz glass is 99.96 weight %.

6. The process according to claim 1, wherein the high silica glass has the following weight composition:

$SiO_2$: 94 to 96% $B_2O_3$: 3.5 to 6%

$Al_2O_3$: 0.1 to 0.5% $Na_2O$: 0.1 to 0.5%.

7. The process according to claim 4, wherein the coating layers are applied at an air pressure of $0.8 \cdot 10^5$ to $1.1 \cdot 10^5$ Pa.

8. The process according to claim 1, wherein the first slurry is applied on a porous ceramic substrate.

9. The process according to claim 1, wherein the barrier layer is densified, has a thickness of about 70 to 140 μm, and a density of up to about 0.5 $g/cm^3$.

* * * * *

UNITED STATES PATENT AND TRADEMARK OFFICE
CERTIFICATE OF CORRECTION

PATENT NO. : 5,534,300

DATED : July 9, 1996

INVENTOR(S) : Stanislav S. SOLNTSEV et al.

It is certified that error appears in the above-indentified patent and that said Letters Patent is hereby corrected as shown below:

```
Title page item [57], line 8, insert "-" in front of --silicon--.
    delete lines 10-12 of the abstract and insert therefor:
```

-- - quartz glass: 90 to 99.9%;

emissivity glaze layer:

- silicon tetraboride (with over 96 weight % of $SiB_4$): 1.5 to 5.0%--;

```
line 13, insert "-" in front of --high--.
```

Column 1, line 28, please insert --°-- after "930";

Column 3, please delete lines 4-10 and insert therefor:

--following weight compositions:

barrier layer:

-silicon tetraboride (with over 96 weight % of $SiB_4$): 0.1 to 10%;

-quartz glass: 90 to 99.9%;

emissivity glaze layer:

-silicon tetraboride (with over 96 weight % of $SiB_4$): 1.5 to 5.0%;

-high silica glass: 95 to 98.5%.--;

UNITED STATES PATENT AND TRADEMARK OFFICE
CERTIFICATE OF CORRECTION

PATENT NO. : 5,534,300
DATED : July 9, 1996
INVENTOR(S) : Stanislav S. SOLNTSEV et al.

It is certified that error appears in the above-indentified patent and that said Letters Patent is hereby corrected as shown below:

Column 4, line 63, please delete "0 6" and insert therefor --0.6--;

Column 6, line 13, please delete "SiB$^4$" and insert therefor --SiB$_4$--; and line 25, after "tetraboride", please insert --with over 96 weight % of--.

Signed and Sealed this

Tenth Day of December, 1996

BRUCE LEHMAN

Attest:

Attesting Officer

Commissioner of Patents and Trademarks